(12) United States Patent
Russell et al.

(10) Patent No.: US 8,215,129 B2
(45) Date of Patent: Jul. 10, 2012

(54) METHOD OF DRAWING MICROSTRUCTURED GLASS OPTICAL FIBERS FROM A PREFORM, AND A PREFORM COMBINED WITH A CONNECTOR

(75) Inventors: Philip St. John Russell, Bath (GB); Brian Joseph Mangan, Bath (GB); Jonathan Cave Knight, Bath (GB); Ian Patrick Kilbride, Wittshire (GB); Timothy Adam Birks, Bath (GB)

(73) Assignee: NKT Photonics A/S, Birkerod (DK)

( * ) Notice: Subject to any disclaimer, the term of this patent is extended or adjusted under 35 U.S.C. 154(b) by 0 days.

(21) Appl. No.: 12/951,485

(22) Filed: Nov. 22, 2010

(65) Prior Publication Data

US 2011/0121474 A1    May 26, 2011

Related U.S. Application Data

(62) Division of application No. 10/506,687, filed as application No. PCT/GB03/01298 on Mar. 20, 2003, now abandoned.

(30) Foreign Application Priority Data

Mar. 20, 2002 (GB) .................................. 0206573.8
Apr. 19, 2002 (GB) .................................. 0209001.7

(51) Int. Cl.
*C03B 37/022* (2006.01)
(52) U.S. Cl. ................ 65/393; 65/379; 65/439; 65/489; 428/398
(58) Field of Classification Search .................... 65/393, 65/379, 439, 489
See application file for complete search history.

(56) References Cited

U.S. PATENT DOCUMENTS

| | | |
|---|---|---|
| 3,990,874 A | 11/1976 | Schulman |
| 4,551,162 A | 11/1985 | Hicks, Jr. |
| 5,599,371 A | 2/1997 | Cain et al. |
| 2001/0029756 A1 | 10/2001 | Paek et al. |
| 2003/0230118 A1 | 12/2003 | Dawes et al. |
| 2004/0261460 A1 | 12/2004 | Roba et al. |

FOREIGN PATENT DOCUMENTS

| | | |
|---|---|---|
| JP | 59-092940 A | 5/1984 |
| WO | WO 82/03345 A1 | 10/1982 |
| WO | WO 00/16141 A1 | 3/2000 |
| WO | WO 00/49435 A1 | 8/2000 |
| WO | WO 00/49436 A1 | 8/2000 |
| WO | WO 03/058309 A1 | 7/2003 |

OTHER PUBLICATIONS

Kazuaki Yoshida et al., Fabrication and Characterization of Side-Hole Single-Mode Optical Fibers, Optical Fiber Technology, 1996, vol. 2, pp. 285-290.
J.C. Knight et al., "All-Silica Single-Mode Optical Fiber With Photonic Crystal Cladding", Optical Letters, Oct. 1, 1996, vol. 21, No. 19, pp. 1547-1549.
R.F. Cregan et al., "Single-Mode Photonic Band Gap Guidance of Light in Air", Science, Sep. 3, 1999, vol. 285, pp. 1537-1539.

*Primary Examiner* — Queenie Dehghan
(74) *Attorney, Agent, or Firm* — Buchanan Ingersoll & Rooney PC

(57) ABSTRACT

A method of manufacturing a microstructured fiber, includes: providing a preform having a plurality of elongate holes; mating at least one, but not all, of the holes with a connector to connect the hole(s) to an external pressure-controller; drawing the preform into the fiber while controlling gas pressure in the hole(s) connected to the pressure-controller.

5 Claims, 8 Drawing Sheets

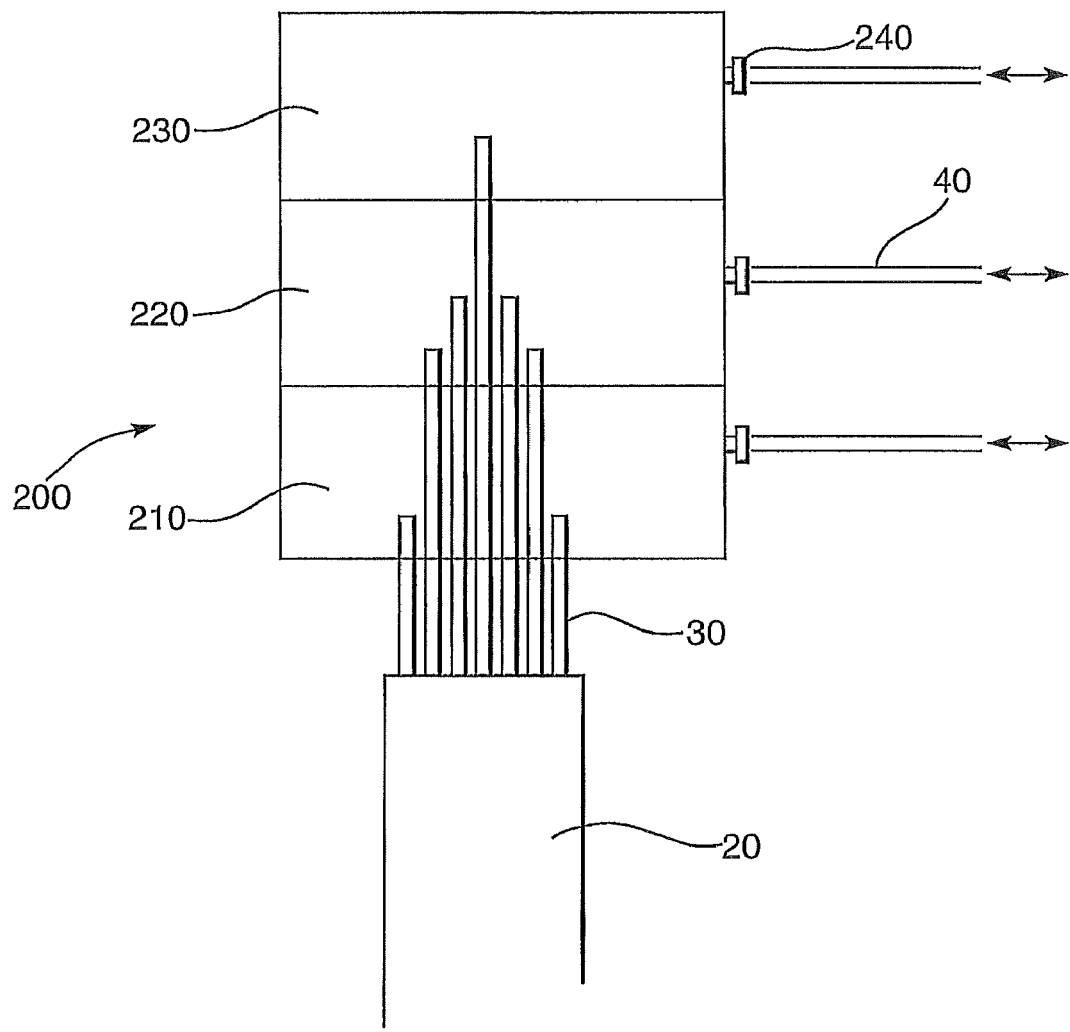

Fig.5.
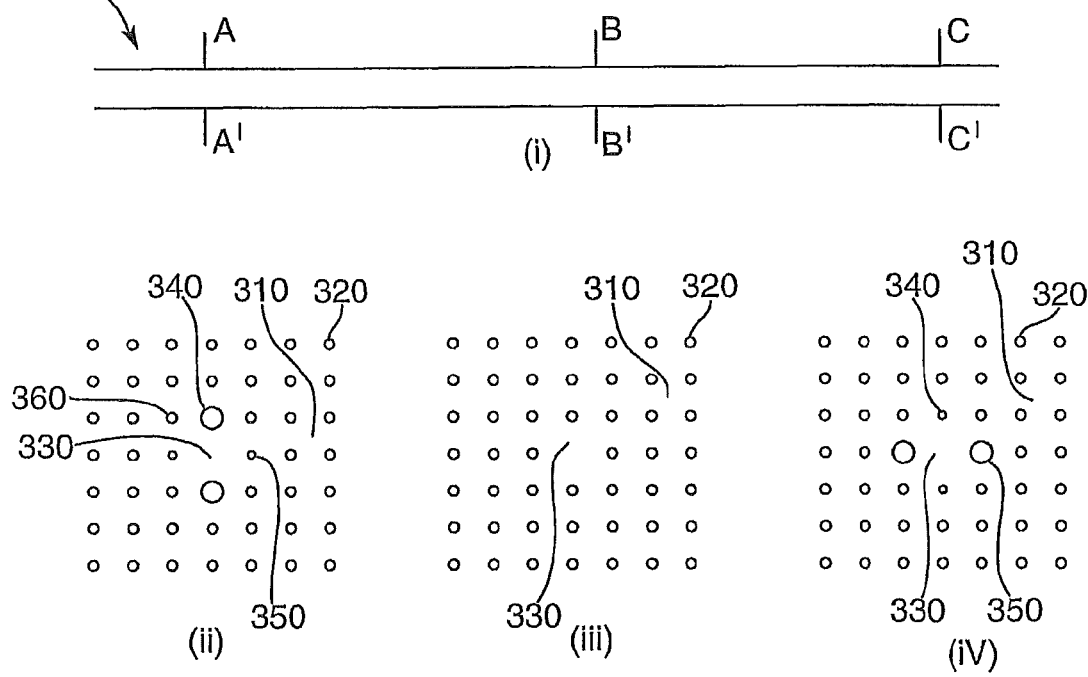
Fig.6.
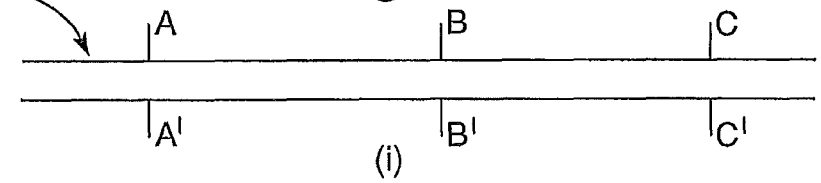
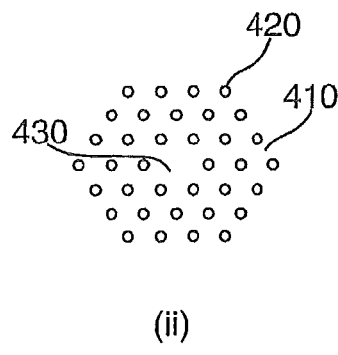
(ii)
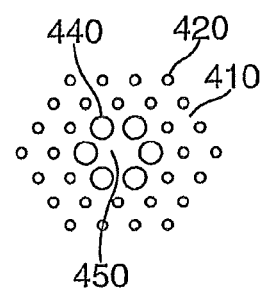
(iii)
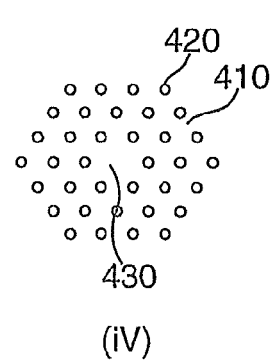
(iv)

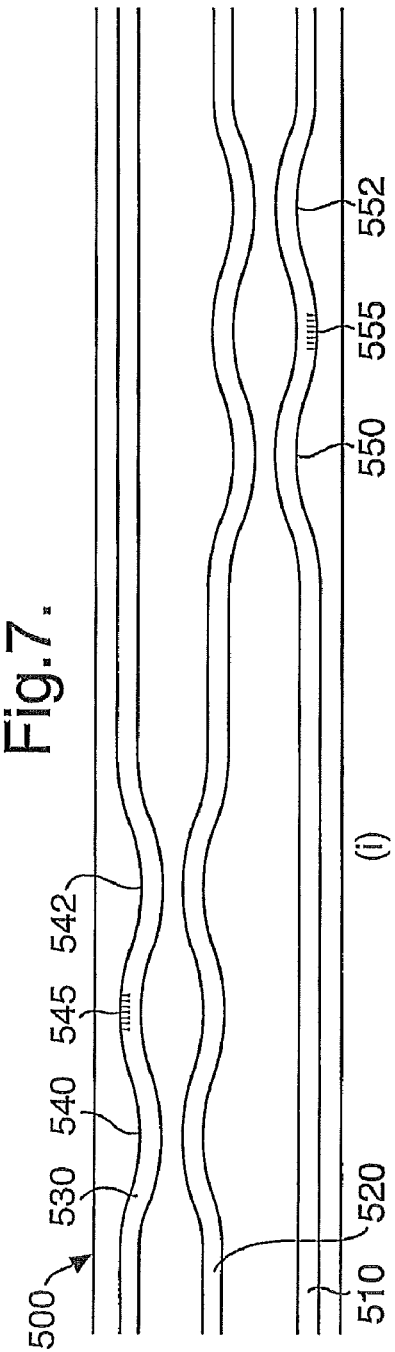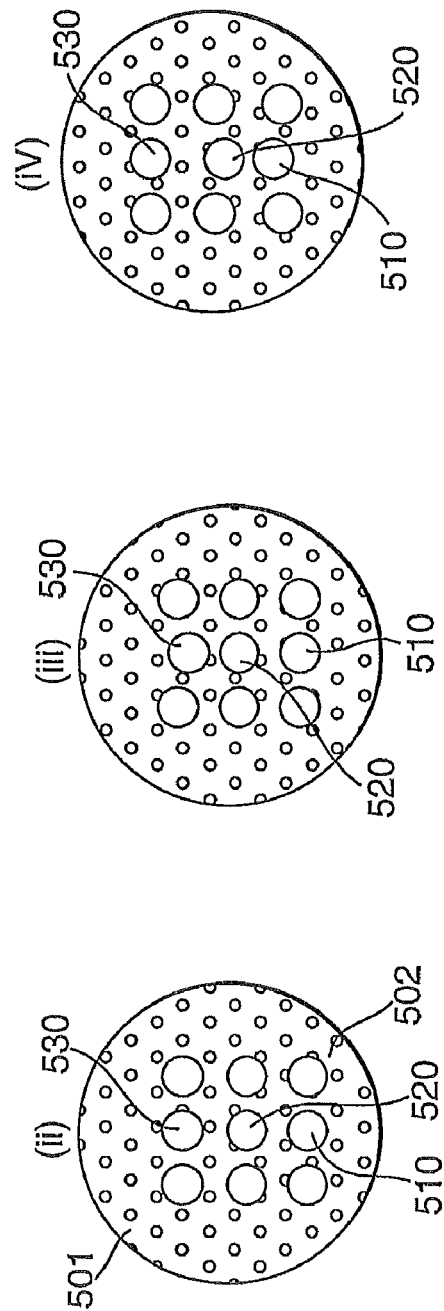
Fig.7.

METHOD OF DRAWING MICROSTRUCTURED GLASS OPTICAL FIBERS FROM A PREFORM, AND A PREFORM COMBINED WITH A CONNECTOR

CROSS-REFERENCE TO RELATED APPLICATIONS

This application is a divisional of U.S. application Ser. No. 10/506,687 filed on Jun. 17, 2005, which is a U.S. national stage application of International Application No. PCT/GB03/01298 filed on Mar. 20, 2003 and which claims priority to United Kingdom Application Nos. 0206573.8 filed on Mar. 20, 2002, and 0209001.7 filed on Apr. 19, 2002, the entire content of all four of which is incorporated herein by reference.

DESCRIPTION

This invention relates to the field of photonic crystal fibres.

Optical fibres are widely used in applications such as telecommunications. Standard optical fibres are typically made entirely from solid materials such as glass, with each fibre having the same cross-sectional structure along its length. Transparent material in one part (usually the middle) of the cross-section has a higher refractive index than material in the rest of the cross-section and forms an optical core. Light is guided in the optical core by total internal reflection from the material surrounding the core, which forms a cladding region. Most standard fibres are made from fused silica glass, incorporating a controlled concentration of dopant, and have a circular outer boundary typically of diameter 125 microns. Standard fibres can be single-mode or multimode.

Different fibres may provide different functions in a system. For example, a length of fibre designed to provide dispersion compensation may be inserted between lengths of standard fibre. Similarly, a length of fibre may act as an optical amplifier or an optical coupler or a sensor or any of a wide range of other devices.

A perennial problem in fibre optics is achieving smooth transitions from one fibre type to another—the "mode-matching" issue. The requirements of a successful transition are insignificant loss (preferably less than 0.1 dB), no conversion between spatial or polarisation modes (unless required), no back reflections and high tensile strength.

A traditional solution is to heat the fibre to its softening temperature and draw it to a taper. The heat source can be a flame or a carbon dioxide laser beam. Mode field transformations can be achieved in which the mode area is reduced or expanded. A related process involves heating a fibre without tapering it; that causes the core dopants to spread out into the cladding and thus enlarge the area of the guided mode. Disadvantages of this technique are that the fibre has to be stripped for processing and then recoated; this weakens it and is a lengthy and expensive process.

In the past few years a new type of optical fibre has been demonstrated, called the photonic crystal fibre (PCF), holey fibre or microstructured fibre [J. C. Knight et al., Optics Letters v. 21 p. 203]. Typically, a microstructured fibre is made from a single solid material such as fused silica glass, within which is embedded an array of holes. Those 'hole' are usually air holes but may alternatively be, for example, regions of a solid material (e.g. silica doped with impurities to change its refractive index). The holes run parallel to the fibre axis and extend the full length of the fibre. A region of solid material between holes, larger than neighbouring such regions, can act as a waveguiding fibre core. Light can be guided in this core in a manner analogous to total-internal-reflection guiding in standard optical fibres.

One way to provide such an enlarged solid region in a microstructured fibre with an otherwise periodic array of holes is to omit one or more holes from the structure. However, the array of holes need not be periodic for total-internal-reflection guiding to take place (we may nevertheless refer to such a fibre as a photonic-crystal fibre).

Another mechanism for guiding light in microstructured fibres is based on photonic bandgap effects rather than total internal reflection. For example, light can be confined inside a hollow core (an enlarged air hole) by a suitably-designed array of smaller holes surrounding the core [R. F. Cregan et al., Science v. 285 p. 1537]. True guidance in a hollow core is not possible at all in standard optical fibres.

Microstructured fibres can be fabricated by stacking glass elements (rods and tubes) on a macroscopic scale to form them in place while fusing them together. This primary preform can then be drawn into a fibre, using the same type of fibre-drawing tower that is used to draw standard fibre from a standard-fibre preform. The primary preform can, for example, be formed from fused silica elements with a diameter of about 0.8 mm.

The microscopic air channels that run along the entire length of a photonic crystal fibre provide the refractive index profile required to guide light at a central defect, either by a modified form of total internal reflection or by photonic band gap effects. It is known in the prior art to alter the properties of those air holes to alter the properties of the fibre.

Conceptually, the simplest method of controlling the size of an air hole in a PCF is, perhaps, to form a preform having a larger-scale approximation to the desired structure, for example by forming the preform from capillaries having different selected hole diameters. However, in practice, it is costly and relatively difficult to manufacture capillaries of different internal diameters and it is difficult to predict the behaviour of such structures during drawing.

International Patent Application No. PCT/GB00/00599 (The University of Bath) teaches that a region of a PCF may be heat-treated after the PCF has been drawn, in order to collapse holes in the heat-treated region.

International Patent Application No. PCT/US99/18089 (Corning Inc.) teaches that the axial properties of a PCF may be varied, for example by varying gas pressure in the preform during the draw. That variation may, in particular, be used to produce a fibre having a dispersion that alternates between positive and negative dispersion in alternate segments of the fibre, producing a net dispersion of zero over the length of the fibre.

International Patent Application No. PCT/GB00/00600 (The University of Bath) teaches a method of making controlled changes in the structure of a photonic crystal fibre whilst it is being drawn. The Application describes producing the photonic crystal fibre by stacking an array of silica capillaries inside a silica tube, sealing the tube inside an evacuable cylinder, whilst leaving some or all of the capillaries protruding from the cylinder at each end, and then evacuating the inside of the tube whilst leaving the insides of some or all of the capillaries open to the atmosphere, so that they expand during drawing. In a particular example, the Application teaches producing a highly birefringent PCF by having four of the capillaries terminate within the cylinder, so that they do not expand during drawing, so that the drawn fibre has two-fold rotational symmetry.

We have realised that the prior-art manufacturing methods provide only limited control over the structure of the drawn fibre.

An object of the invention is to provide an improved method of manufacturing a PCF and hence to provide PCFs having improved functionality.

According to the invention there is provided a method of manufacturing a microstructured fibre, comprising:

(i) providing a preform comprising a plurality of elongate holes;

(ii) mating at least one of the holes with a connector to connect the hole(s) to an external pressure-controller;

(iii) drawing the preform into the fibre whilst controlling gas pressure in the hole(s) connected to the pressure-controller.

By the term 'external pressure-controller', we mean any suitable means for changing the internal pressure of the holes from atmospheric pressure to another selected value, including, for example, applying a static increased or decreased pressure by means of a piston, but not merely sealing the hole during drawing to create a pressure difference.

Thus, during drawing of the fibre, the size of individual holes can be controlled by individually addressing each hole in the preform and changing the pressure in that hole. If several holes are addressed simultaneously, then the structure which emerges in the actual fibre can be altered during the drawing process. Radical changes in fibre properties are possible. For example, different devices may be created during the draw along a single length of fibre, with adiabatic transitions provided between each link. Complex arrangements of devices may be produced from a preform comprising a uniform array of holes.

Holes formed in different portions of the cross-section of the drawn fibre may be pressurised by different amounts. For example, the drawn fibre may comprise a cladding region surrounding a core region and holes forming an innermost ring of the cladding region, adjacent to the core region may be pressurised to different pressures from each other.

In general, during drawing of the fibre, larger holes will tend to grow larger and smaller holes will tend to grow smaller. Pressurisation (including depressurisation) may be used to counteract those tendencies, for example in the innermost ring of the cladding region.

Preferably, the preform comprises a plurality of elongate elements, arranged side by side in a bundle, a plurality of the elements being tubes, wherein each tube defines one of the holes in the preform.

Alternatively, the preform comprises a matrix material that defines the holes.

The external pressure-controller may increase the pressure in the hole above atmospheric pressure. Alternatively, the external pressure-controller may decrease the pressure in the hole below atmospheric pressure. The pressure in the hole may be kept constant throughout the drawing of the fibre. Alternatively, the pressure in the hole may be varied during the draw. Thus variations in the cross-sectional area of the hole may be provided along the length of the drawn fibre. The pressure may be pulsed periodically.

As discussed above, the pressure-controller may be any suitable device, which may apply a static or a varying pressure. The pressure-controller may be, for example, a rotary vane pump, a peristaltic pump or a cylinder piston pump.

The hole with which the connector is mated may form a hole in a cladding region of the drawn fibre. The hole with which the connector is mated may form a hole in a core region of the drawn fibre; the core region of the drawn fibre may be a hole. The core region hole may be pressurised to a lower pressure than holes in the cladding region.

Preferably, a plurality of the holes are connected to the external pressure-controller.

The method may include pressurising further groups, each comprising at least one of the holes, to a second pressure or pressures, for example by connecting them to further external pressure-controllers. For example, preferably the method includes connecting at least one (preferably a plurality) of the holes to a second external pressure-controller and the method may include connecting at least one (preferably a plurality) of the holes to a third external pressure-controller.

Preferably, the method includes the step of producing a plurality of devices arranged axially along the PCF by varying over time the pressure applied to the hole or holes. It may be that each of the plurality of devices is the same; the method thus provides a method of mass-producing large numbers of a particular device, spaced at intervals along a single fibre; after production, the devices may then be separated (e.g. by cleaving the fibre). Alternatively, the plurality of devices may comprise a plurality of different devices; thus complex optical effects such as signal processing may be achieved in a single fibre.

The method may include the step of varying over time the rate at which the fibre is drawn from the preform.

The method may include the step of varying over time the preform feed rate. The preform feed rate may even be negative for brief periods of time, such that the preform is being pulled in a direction opposite to the direction in which the fibre is being drawn.

The method may include the step of varying over time the furnace temperature.

Preferably, the pressurisation results in at least one elongate hole formed in the drawn fibre having a different transverse area in one part of the fibre from its transverse area in another part of the fibre. At least one hole may be collapsed completely over a length of the fibre. Such an arrangement may be used for example to create and destroy local cores over particular lengths of the fibre. Similarly, creating and destroying holes adjacent to a core region may be used to create lengths of fibre having an enlarged or reduced core.

Preferably, the pressurisation results in at least one part of the dielectric matrix region having a different transverse area in one part of the fibre from its transverse area in another part of the fibre.

The pressurisation may result, in a transverse cross-section of the drawn fibre, in a plurality of concentric regions, wherein alternate adjacent regions are of a higher and a lower effective refractive index respectively.

The pressurisation may result in the drawn fibre being a W-profile fibre over at least part of its length.

The pressurisation may result in the drawn fibre comprising a long period grating.

The variation in pressurisation may result in a change in the symmetry of the fibre, such that a portion of the fibre is birefringent.

Preferably, two portions of the fibre are birefringent, but their principal polarisation axes are rotated relative to each other by the variation in pressurisation.

Also according to the invention there is provided a photonic crystal fibre comprising a core region and a cladding region comprising a plurality of elongate holes, the fibre comprising a first region of its length in which the holes are arranged in a first pattern having at-most-two-fold rotational symmetry, such that the fibre has in the first region a fast polarisation axis and a slow polarisation axis, and a second region of its length in which the holes are arranged in a second pattern having at-most-two-fold rotational symmetry, such that the fibre in the second region has a fast polarisation axis and a slow polarisation axis, the polarisation axes in the second region being rotated relative to the polarisation axes in the first region, the fibre further comprising a transition region, between the first region and the second region, in which the at least one of the hole changes in cross-sectional area so that the first pattern changes into the second pattern.

Thus, a PCF with low birefringence may be turned adiabatically into a fibre with high birefringence. A twist-compensated PM fibre link (designed to have zero DGD) may be made by simply altering the distribution of pressure in the holes part-way through the draw so as to make the slow axis into a fast axis and vice-versa.

Further portions of the fibre may be birefringent and have rotated polarisations. Any suitable photonic crystal structure may be used to provide birefringence; for example, the structure may be based on a square lattice.

The variation in pressurisation may result in a change in core size in the drawn fibre, such that at least one of the devices comprises a fibre portion having a larger core region and at least one of the devices comprises a fibre portion having a smaller core region; thus, for example, a large core may be turned into a small core by increasing the pressure in surrounding holes and collapsing; a similar effect can be produced by altering the drawing tension.

Also according to the invention there is provided a photonic crystal fibre comprising a core region and a cladding region comprising a plurality of elongate holes, the fibre comprising a region of its length in which the holes adjacent to the core region are of a larger cross-sectional area, and the core region is of a smaller cross-sectional area, than in an adjacent length of the fibre, such that, in use, the fibre has an increased nonlinear response to propagating light in that region of the fibre.

The variation in pressurisation may result in a change in core size, such that at least one of the devices is a nonlinear fibre portion, comprising a core region that is sufficiently small for significant nonlinear optical effects to occur in use. Thus, ultra-small core fibre may be produced in the center of an otherwise medium-core fibre link—that may allow efficient nonlinear functions to be built seamlessly into a telecommunications system. Because there is no requirement to strip and recoat the fibre, it should have unimpaired tensile strength.

The drawn fibre may comprise a plurality of core regions. Preferably, the variation results in the separation of at least two of the cores being reduced in a region of the fibre, such that at least one of the devices comprises an optical coupler comprising the reduced separation region. Preferably, the devices comprise two optical couplers that form a Mach-Zehnder interferometer. Thus, in-line Mach-Zehnder interferometers may be produced by a simple process of reducing the air hole size between two cores at two points along a dual-core length.

Preferably, the devices comprise a network of switches and/or filters formed from the plurality of couplers.

Also according to the invention there is provided a photonic crystal fibre comprising at least three core regions and a cladding region comprising a plurality of elongate holes, the fibre comprising at least one coupler between a first pair of the core regions and at least one coupler between a second, different, pair of the core regions, each coupler comprising a region of the fibre in which the cross-sectional area of the holes between the coupled cores is smaller than in adjacent lengths of the fibre, such that the cores are brought closer together.

Such an arrangement would have considerable advantages over taper post-processing, where it is very difficult (if not impossible) to heat-treat selected holes while keeping the rest unaffected. In-line fabrication allows couplers to be created between any group (of two or more) cores while leaving the others unaffected; further down the fibre couplers may be created between different cores.

The fibre may comprise more than two cores. Preferably, the variation results in the separations of the cores being reduced over a plurality of portions of the fibre to form optical couplers between each of the more than two cores. Thus, still more complex networks of devices may be produced.

Preferably, transition regions formed between each of the optical devices are sufficiently gradual to be adiabatic. Alternatively, the transition may be abrupt. Thus, in one draw, a fibre may be produced with many different properties at different positions along its length, all connected by seamless low-loss transitions.

The condition of the draw may be oscillated between two states over time to form a transition region, the first state being matched to the mode of a first of the optical devices and the second state being matched to the mode of a second of the optical devices; for example, one state may be arranged to match a single-mode fibre and the other state may be arranged to match a specialty fibre such as a dispersion compensating fibre (DCF), an amplifier or a highly nonlinear fibre.

Also according to the invention there is provided a photonic crystal fibre comprising a core region and a cladding region comprising a plurality of elongate holes, the fibre comprising a first length in which the holes are arranged in a first transverse pattern providing a first function, a second length in which the holes are arranged in a second transverse pattern providing a second function, and a transitional length along which at least one of the holes oscillates in cross-sectional area such that the holes oscillate between the first pattern and the second pattern, such that, in use, light is coupled in the transitional length between a mode guided in the first length and a mode guided in the second length.

Similarly, the method may include the step of manufacturing twist-compensated DGD-free fibre by oscillating the structure to and fro periodically (the period being perhaps of a few meters) along the length of the drawn fibre. That would make the exact cutting of length—to achieve DGD-free operation—very easy since an integral number of periods is needed. The accuracy of the actual dispersion would then be within 100.times.dL/L percent of the required value.

Similarly, at least one of the holes oscillates between a first value and a second value, such that the holes oscillate between a first pattern and a second pattern and thus substantially avoid an unwanted phase-matching condition.

Also according to the invention there is provided a photonic crystal fibre comprising a core region and a cladding region comprising a plurality of elongate holes, the fibre comprising a length in which the cross-sectional area of at least one of the holes oscillates between a first value and a second value, such that the holes oscillate between a first pattern and a second pattern and thus substantially avoid an unwanted phase-matching condition.

The method may include the step of producing a DCF with graded properties that match the dispersion curve in standard telecomm fibre over the telecommunications bands (dispersion, slope, curvature and slope of curvature etc.). That may be achieved by choosing the functional shape along the length of the fibre appropriately. The dependence of dispersion curve on geometry may be calculated, and used to solve an integral equation for the desired link properties—the required length dependence is given by a function inside the integral.

Parameters of the draw may be controlled during manufacture to produce a desired structure by feedback from direct measurement of the drawn fibre (e.g. the diameter of a hole or a plurality of holes).

Preferably, the method includes the step of calibrating the relationship between parameters of the draw and parameters of the drawn fibre.

Preferably, the method further comprises varying parameters of the draw according to the calibration results to produce a fibre having a selected structure. Thus, the relationship between draw parameters such as pressure, temperature and draw speed and fibre parameters such as hole size and pitch are preferably determined in prior calibration runs. Such calibration may be achieved, for example, by carrying out a large number of sample draws and measuring the results of varying, at any one time, one or more parameters of the draw.

Preferably, the pressure applied to the or each hole is controlled by a digital signal; that is, the pressure may be applied in bursts or pulses of a fixed pressure, with more pulses being applied in a given time interval to apply, effectively, a higher pressure (of course, alternatively an analogue, continuously varying signal may be used).

Elements of the preform may be selected according to the structure desired in the drawn fibre. For example, all of the elements of the preform may be tubes, which may be arranged to provide a triangular lattice of holes in the drawn fibre. At least one of the elements of the preform may be a solid rod; use of such a rod allows for the manufacture of more complex microstructure by providing a larger region of solid dielectric material in the drawn fibre than is provided by a capillary. The preform may further comprise a larger tube that surrounds the bundle of tubes and forms a jacket region in the drawn fibre.

The drawn microstructured fibre may be arranged to guide light in a core by photonic-band-gap guidance. Alternatively, the drawn microstructured fibre may be arranged to guide light in a core by index-guidance; for example, the core may then be drawn from a solid rod in the preform.

The holes of the preform may be connected to different pressures in any suitable way; examples of possible arrangements are set out below.

A portion of the preform may be retained undrawn during the drawing of the fibre, and individual connections may be made directly, for example via a hose, from one or more external pressure-controllers to each hole or holes to be pressurised by that pressure-controller.

Alternatively, a connector may be provided to connect the holes to the external pressure-controller.

Also according to the invention there is provided a connector for connecting a preform, which is for a microstructured fibre and which comprises a plurality of holes, to a pressure source, the connector comprising a plurality of elements arranged to mate with one or more of the holes, each element being connectable to a pressure source.

Preferably, different ones of the holes are connectable, individually or in groups, to different pressure sources.

Preferably, the preform comprises a plurality of tubes and the elements are chambers in which one or more of the tubes terminate. Preferably, each chamber is in fluid communication with a passage that is connectable to the pressure source. More preferably, the passage terminates in a valve.

The chambers may be distributed in the connector in a plane substantially orthogonal to the direction in which the tubes are intended to pass through the apertures; thus, the chambers may be side-by-side in that plane. The chambers may be adjacent to the apertures. Preferably, the chambers are recesses in a side of the connector. The passages may pass from the chambers to the opposite side of the cap; alternatively, the passages may pass to another side of the cap. Preferably, the recesses are arranged to be sealed around the ends of the tubes.

The chambers may be distributed in the connector along the direction in which the tubes are intended to pass through the aperture; thus at least one of the tubes may pass through one or more chamber and terminate in a chamber arranged further from the aperture than the chamber(s) through which that tube passes. Such a connector is designed to receive preform tubes of two or more different lengths, such that the tubes of each length, or within different ranges of lengths, terminate in a different chamber.

Also according to the invention there is provided a method of manufacturing a microstructured fibre, comprising:

(i) providing a preform comprising a plurality of elements arranged side-by-side in a bundle, a plurality of the elements being tubes;

(ii) connecting at least one of the tubes to an external pressure-controller by attaching a connector to the tube;

(iii) drawing the preform into the fibre whilst controlling gas pressure in the tube(s) connected to the external pressure controller.

Also according to the invention there is provided a connector for connecting a preform, which is for a microstructured fibre and which comprises a plurality of tubes, to a pressure source, the connector comprising a plurality of apertures arranged to receive the ends of one or more of the tubes and a plurality of chambers in which one or more of the tubes passing through the apertures terminate, each chamber being connectable to a pressure source.

Also according to the invention there is provided a method of manufacturing a microstructured optical waveguide, comprising:

(i) providing a preform in which there are a plurality of holes running side-by-side through the preform;

(ii) coupling a pressure controller to one or more, but not all, of the holes for controlling the gas pressure in those holes;

(iii) drawing the preform into an optical waveguide while controlling the gas pressure in the holes that are coupled to the pressure controller.

A method, described above as being according to the invention, may thus further comprise the step of mating a connector with an end of the preform such that the elements of the connector mate with at least some of the holes, connecting the elements to one or more external pressure-controllers and pressuring the holes to one or more selected pressure during the draw.

For example, the method may further comprise the step of placing a connector, such as is described above as being according to the invention, over the end of the preform such that the ends of at least some of the tubes pass through the apertures and into the chambers, connecting the chambers to one or more external pressure-controllers and pressuring the tubes to one or more selected pressure during the draw.

Also according to the invention, there is provided a microstructured fibre manufactured according to a method described above as being according to the invention.

Embodiments of the invention will now be described, by way of example only, with reference to the drawings, of which:

FIG. 4 is a third arrangement for pressurising the preform of FIG. 1;

FIG. 5 is a fibre according to the invention having polarisation axes that change adiabatically along the length of the fibre;

FIG. 6 is a fibre according to the invention having a small, nonlinear core;

FIG. 7 is a fibre according to the invention that includes a network of Mach-Zehnder interferometers between its cores;

Figure 1:
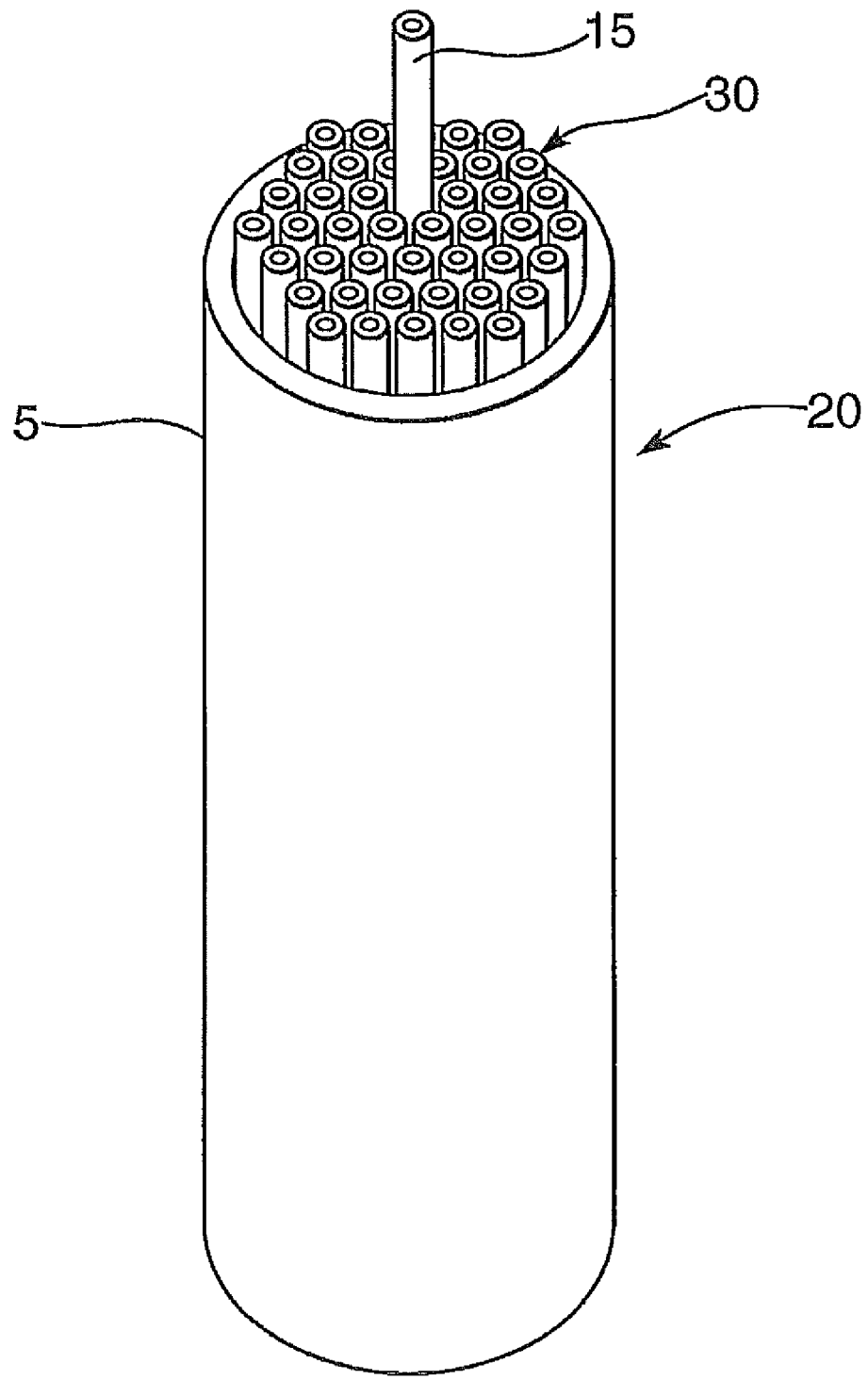
FIG. 1 is an example of a preform for use in a method according to the invention.

A typical preform 20 (FIG. 1) for a photonic crystal fibre, of a type well known in the prior art, comprises a bundle of thin tubes 30, arranged in a triangular lattice pattern and held together inside a large tube 5. At the center of the preform 20, a solid cane 15 is provided in place of a tube 30 in the lattice arrangement. A photonic crystal fibre 10 is drawn from the preform in the usual way. In the drawn fibre 10, tubes 30 form a cladding region comprising a plurality of elongate holes embedded in a silica matrix. Cane 15 forms a solid, elongate core region within the fibre. Large tube 5 forms a jacket region that protects the fibre. In this example, light is guided in the core region by total internal reflection from the cladding region, which has a lower effective refractive index than the refractive index of the core region.

Figure 2:
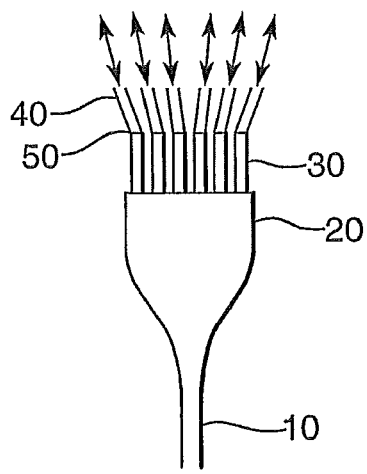
FIG. 2 is a first arrangement for pressurising the preform of FIG. 1.

In a first method of individually pressurising holes in the preform 20 during drawing into fibre 10 (FIG. 2), tubes 30 are arranged to protrude from jacket tube 5 in preform 20. Hoses 40 are attached to selected ones of the protruding ends of tubes 30; hoses 40 are held in place by O-rings 50. Hoses 40 are connected at their other ends to external pressure-controllers (not shown).

During drawing of fibre 10 from preform 20, the pressures inside tubes 30, and hence the holes into which they are drawn, are varied by varying the pressure produced by the external pressure-controllers in hoses 40. The pressure in hoses 40 is varied in time and also different pressures are applied at any one time to different ones of hoses 40. Thus the holes produced in the cladding region of the drawn fibre 10 vary in their cross-sectional areas both along the fibre and from hole to hole in fibre transverse cross-sections.

Figure 3A:
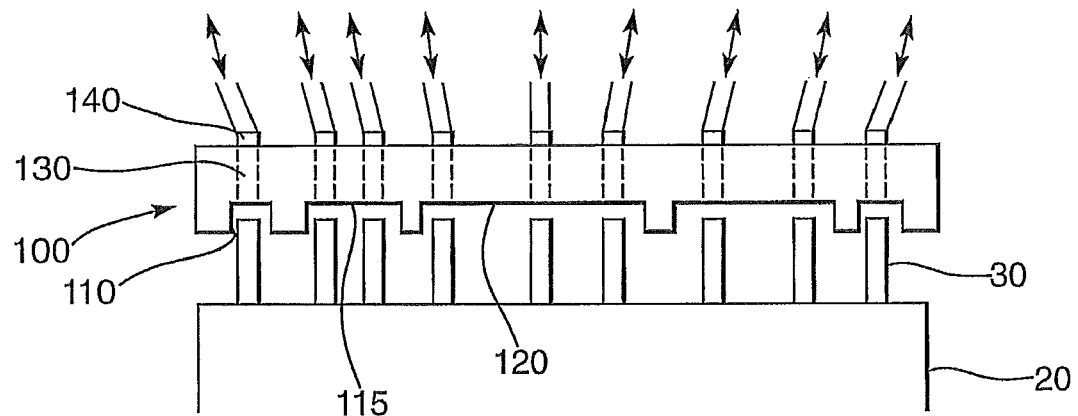
FIG. 3 is a second arrangement for pressurising the preform of FIG. 1, shown (a) in vertical cross-section and (b) in plan from underneath.
Figure 3B:
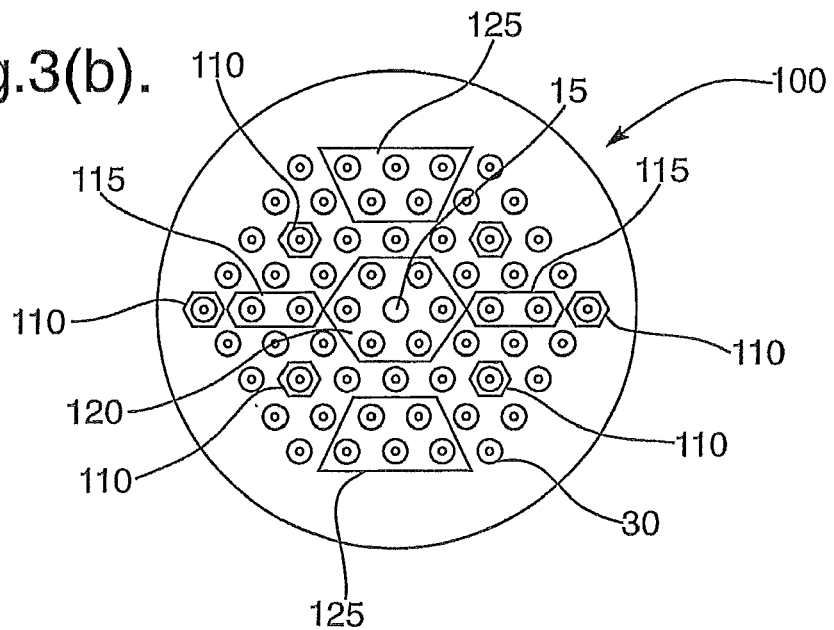

In an alternative method (FIG. 3), as an alternative to connecting hoses directly to preform 10, an intermediate connector 100 is used.

Connector 100 is a flat disk into which have been cut a number of chambers in the form of recesses 110, 115, 120, 125. Recesses 110, 115, 120, 125 are arranged to mate with tubes 30 by receiving the ends of tubes 30 where they protrude from the preform 20. Recesses 110 are each arranged to receive the end of one of tubes 30. Recesses 115 are each arranged to receive the end of two of tubes 30. Recess 120 are each arranged to receive the ends of groups of seven of tubes 30 (or six plus cane 15). Recess 125 are each arranged to receive the ends of groups of five of tubes 30. The tubes 30 are sealed in the recesses 110, 115, 120, 125 by means of a gasket.

Passages 130 pass through connector 100 to valves 140. Prior to drawing, hoses 40 are attached to valves 140. The other ends of hoses 40 are attached to external pressure-controllers, as before. In this arrangement, the pressure produced by the controllers affects the pressure in tubes 30 by changing the pressures in recesses 110, 115, 120, 125. Thus, for example, all seven tubes in each recess 120 are pressurised to the same pressure, whereas the pressures in tubes in recesses 110 may be varied individually.

An alternative form of connector is shown in FIG. 4. In this example, preform 20 is arranged so that different ones of tubes 30 protrude from preform 20 by different lengths. Intermediate connector 200 comprises three chambers 210, 220, 230, arranged in a stack for mating with tubes 30. Each chamber has a valve 240 to which hoses 40 are connected. The other ends of hoses 40 are attached to external pressure-controllers, as before.

Each chamber has a plurality of holes (not shown) in its base; each hole is either sealed or contains an O-ring, through which one of tubes 30 passes. The tubes 30 are divisible into three length ranges. The shortest terminate in the bottom chamber 210 in the stack. The middle-length tubes pass completely through the bottom chamber 210 and terminate in middle chamber 220. The longest tubes pass through chambers 210, 220 and terminate in chamber 230.

During drawing, each of chambers 210, 220, 230 is pressurised (or partially or completely evacuated) to a different pressure. The size of each hole produced in the final fibre depends on the pressure in the particular chamber in which the tube 30 that formed the hole terminates.

The cross-sectional and axial shape and distribution of the holes in fibre 10 will depend on how the pressure in tubes 30 differs from tube to tube and changes over time. In the steady state, the relationship between hole size and hole pressure is given by 1 p=r, where .sigma. is surface tension of the silica matrix material and r is the radius of the hole.

For any particular device to be provided in fibre 10, the sites of holes that are to be enlarged or reduced are identified and the corresponding pressures required in tubes 30, to produce the required hole diameters, are calculated by computer according to the above relationship. The computer is programmed with the desired transverse hole diameters and their variation with time. The computer is arranged to control the pressures supplied by the external pressure-controllers, according to the relationship given above, to produce the desired hole shapes. A calibration run is carried out to confirm that the fibre material behaves as predicted during the draw and any necessary parametric adjustments made.

FIGS. 5 to 8 are examples of devices that can be produced by examples of the method of the invention.

An example of a fibre produced by the method is photonic crystal fibre 300 (FIG. 5), which exhibits substantially no differential group delay (DGD). A fibre having that property is described in British Patent Application No. 0200603.9 (BlazePhotonics Limited), replaced by International Patent Application No. PCT/GB2003/000060, which are hereby incorporated herein by reference. In that patent, DGD is avoided by providing a 90 degree twist, or a series of twists forming a rocking filter, halfway along a photonic crystal fibre, so that the polarisation mode of propagating light and the polarisation axes of the fibre are rotated relative to each other. Thus any DGD experienced by light propagating in the first half of the fibre is cancelled out by propagation through the second half of the fibre.

In the fibre 300 of FIG. 5, the same effect is achieved, during the draw and without the need for twisting the fibre. The polarisation axes of fibre 300 are gradually swapped by changing the size of hole in the cladding region of the fibre 300, by changing the pressurisation of the holes during the draw in accordance with the invention. The fibre 300 comprises a cladding region comprising a square array of holes 330 formed in matrix material 310, and a solid silica core region 330. In transverse plane A-A' (FIG. 5(*ii*)), the square lattice pattern of holes 320 results in there being eight holes adjacent to the core 330. Of those eight, four holes 360 at the corners of the square are the same size as holes 320. Holes 340 on opposite sides of the core region 330 are enlarged relative to holes 320. The remaining two holes 350 have a cross-sectional area that is reduced relative to holes 320. The enlarged holes 340 are produced by applying a higher pressure during a first period of drawing to the ones of tubes 30 from which they are formed; the reduced holes 350 are produced by applying a lower pressure to the corresponding ones of tubes 30. The fibre thus has a fast polarisation axis passing through enlarged holes 340 and a slow polarisation axis in a direction orthogonal to the fast axis.

Once a desired length of fibre 300 has been drawn with the hole configuration of FIG. 5(*ii*), drawing is continued but the pressure in holes 340 is reduced and the pressure in holes 350 is increased. Holes 340, 350 thus gradually change size until at plane B-B'0 (FIG. 5(*iii*)) at what will be the center of the fibre 300, they are the same size as holes 320, such that the cladding region is a uniform lattice. The change in applied pressure is continued so that at plane C-C', holes 340 are the size at which holes 350 were in plane A-A' and vice versa. The rest of fibre 300 is drawn with fixed pressures, so that from plane C-C' onwards, the fibre has a fast polarisation axis through holes 350 and a slow polarisation axis through holes 340. DGD experienced by light propagating in fibre 300 to plane B-B' is thus cancelled out by propagation onwards from plane B-B' in the half of the fibre in which the polarisation axes have been reversed. The distance from plane A-A' to B-B' and from B-B' to C-C' is approximately 1 m, which is sufficiently long to provide a lossless (adiabatic) transition.

Another example of a fibre produced by the method is photonic crystal fibre 400 (FIG. 6.), which includes a small nonlinear core region 450. In transverse planes A-A' and C-C' (FIGS. 6(*ii*), (*iii*)) the fibre has a uniform cross-section, comprising a core region 430 surrounded by a cladding region comprising holes 420 arranged on a triangular lattice pattern in matrix material 410. Core region 430 has a diameter of about 5 microns. During drawing of fibre 400, beyond plane A-A', the pressure in the six holes 440, which are adjacent to the core region 430, is increased relative to the pressure in holes 420. Holes 440 expand relative to holes 420 (FIG. 6(*iii*)) and the expansion forces silica material out of the core region, forming a small core region 450 of diameter about 2 microns. The holes 440 reach a maximum size at plane B-B' and then the pressure is reduced again so that the core region returns at plane C-C' to the size it had in plane A-A'.

Large holes 440 concentrate light in small core region 450 and nonlinear effects, such as self-phase modulation and self-focusing, result for sufficiently high light intensities.

Another example of a fibre produced by the method is photonic crystal fibre 500 (FIG. 7), which comprises a pair of Mach-Zehnder interferometers formed between its cores by the method of the invention. The fibre comprises a cladding region formed from a triangular lattice of holes 502 embedded in a silica matrix 501 and nine core regions (including cores 510, 520 and 530) arranged on a square lattice and formed where holes are missing in the triangular cladding lattice (the triangular lattice is shown only schematically in FIG. 7). One Mach-Zehnder interferometer comprises a pair 540, 542 of couplers formed between cores 520, 530 and the other comprises a pair 550, 552 of couplers formed between cores 510, 520. A long-period grating 545 is formed on fibre 530 between couplers 540, 542 and another long-period grating 555 is formed on fibre 510 between couplers 550, 552.

Each coupler 540, 542 is formed by reducing the pressure in the holes between cores 520 and 530 during the draw so that those holes are reduced in diameter and cores 520, 530 are brought closer together (FIG. 7(*iii*)). Similarly, each coupler 550, 552 is formed by reducing the pressure in the holes between cores 510 and 520 so that those holes are reduced in diameter and cores 510, 520 are brought closer together (FIG. 7(*iv*)).

Thus multiple waveguides are provided in fibre 500 in the form of the fibre cores and signals may readily be transferred between cores 510, 520, 530 via the Mach-Zehnder interferometers.

It will readily be appreciated that other, more complex, networks of devices may be formed in fibre 500 by forming couplers between others of the nine core regions at different points along the fibre length.

Another example of a fibre produced by the method is photonic crystal fibre 600 (FIG. 8), which comprises a length of highly birefringent fibre and a length of nonlinear fibre and a region between those lengths in which light is coupled adiabatically between the two fibre types.

Figure 8:
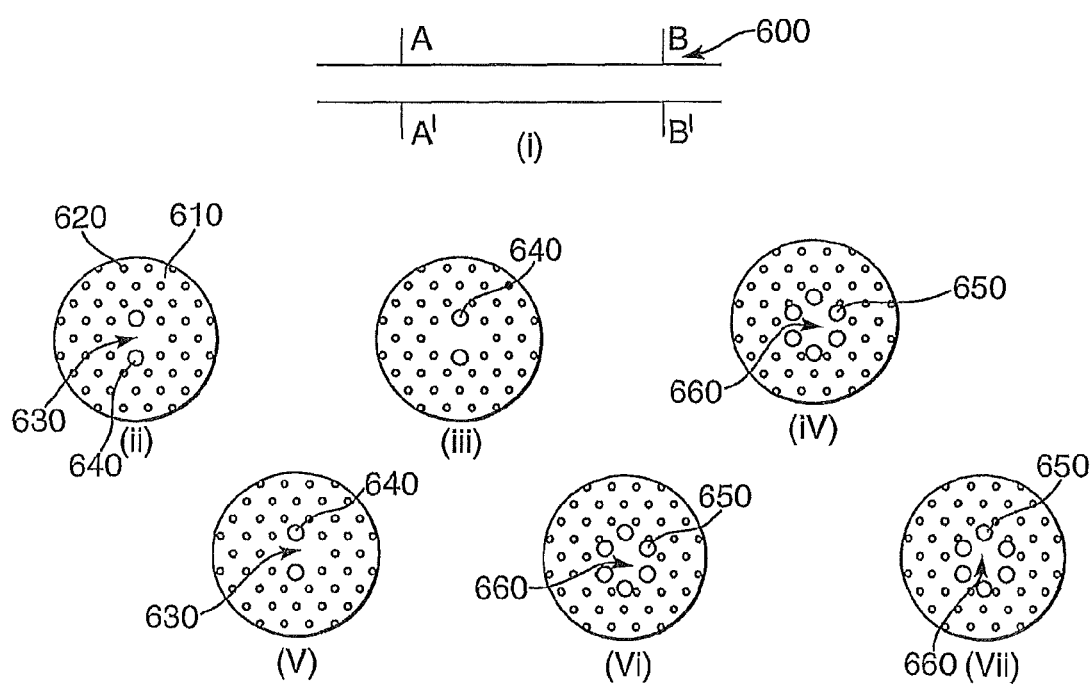
FIG. 8 is a fibre according to the invention in which propagating light is coupled between two states.

FIGS. 8(*ii*) to (*vii*) are cross sections through fibre 600 taken at 1 m intervals between transverse plane A-A' and transverse plane B-B'. Fibre 600 comprises a core region 630, surrounded by a cladding region comprising holes 620 embedded in silica matrix 610 (again, the cladding region structure is shown only schematically).

In FIGS. 8(*ii*) and (*iii*), fibre 600 has a highly birefringent structure, resulting from two enlarged holes 640, positioned adjacent to and on opposite sides of the core region 630, which are produced by providing increased pressure in the tubes 30 forming those holes during drawing from the preform.

In FIGS. 8(*vi*) and (*vii*), fibre 600 has a highly nonlinear structure resulting from a small core region 650 and six adjacent enlarged holes 660 (in a similar arrangement to the embodiment of FIG. 6(*iii*)).

In FIGS. 8(*iv*), (*v*) and (*vi*), the structure of fibre 600 oscillates between the highly birefringent structure and the non-linear structure. That oscillation is achieved by varying during the draw the pressure in the four holes adjacent to the core region of the fibre that are not holes 640. The changes in hole size and core size along this transitional length of fibre are very gradual and light propagation is essentially loss-less.

Light propagating in the fibre 600 is thus adiabatically coupled between a mode that propagates without loss in the highly birefringent length of the fibre and a (different-shaped) mode that propagates without loss in the highly nonlinear length of the fibre. As light passes along the oscillating structure, more and more light is coupled from the mode of the highly birefringent region to the mode of the highly nonlinear region.

Figure 9:
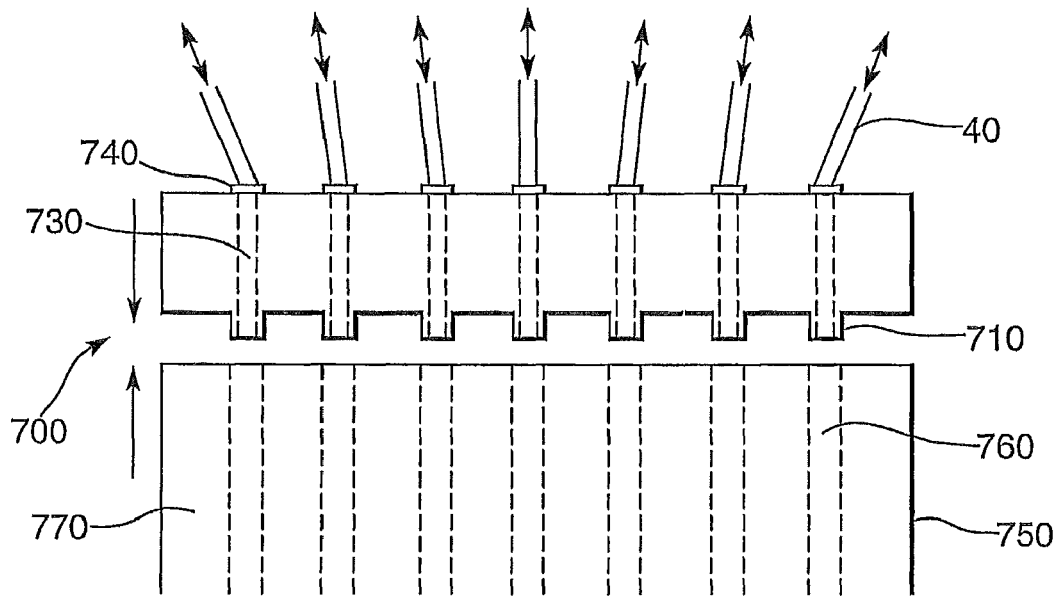
FIG. 9 is an arrangement for pressurising a second example of a preform for use in a method according to the invention.
Figure 10:
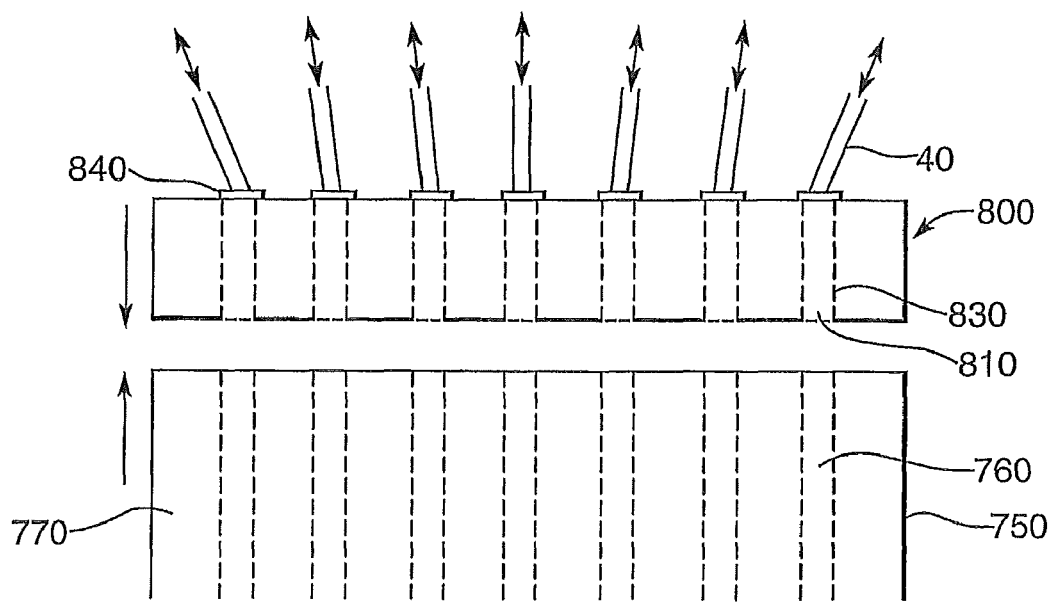
FIG. 10 is a second arrangement for pressurising the preform of FIG. 9.

Of course, a photonic crystal fibre according to the invention may be drawn from an alternative form of preform, such as preform 750 shown in FIGS. 9 and 10. Holes 760 in preform 750 are not defined by protruding tubes 30 but by a matrix material 770; thus preform 750 is a monolithic one-piece preform. It may be made, for example, by drilling holes 760 into a block of glass. Alternatively, it may be made by using a sol-gel.

Connector 700 (FIG. 9) is an example of a connector for connecting holes 760 to pressure sources. The connector, like connector 100, comprises valves 740, to which are connected hoses 40. The other ends of hoses 40 are attached to external pressure-controllers. However, passages 730 pass through connector 700 from valves 740 to plugs 710. Plugs 710 are arranged to mate with holes 760 by insertion therein.

Connector 800 (FIG. 10) is a second example of a connector for connecting holes 760 to pressure sources. This connector similarly comprises valves 840 and passages 830, corresponding to valves 740 and passages 730 in connector 700. However, this connector does not have plugs 710 or recesses 110, 115, 120; rather, passages 830 are mated to holes 760 by direct abutment, the join being sealed with an appropriate sealant (e.g. a sealant gel) and connector 800 and preform 750 being held in place by any appropriate means (e.g. a clamp).

As will be understood, the invention is particularly advantageous for providing transitions between lengths of fibre having different properties. For example, an embodiment of the invention is a mode filter; that is, a fibre comprising a first section that supports a smaller number of modes and a second section that supports a larger number of modes. A transition between the first and second sections (and back again, if desired) is readily provided by gradually changing the size of holes in the fibre cross-section. A relatively short section supporting a smaller number of modes in a fibre otherwise supporting a larger number of modes is sufficient to eliminate the extra, unwanted modes downstream of that section. A particularly important case is when the first section is a section supporting only a single mode.

Another example of a transition provided according to the invention is a transition between core shapes. Thus, an embodiment of the invention is a fibre comprising a core having a first shape in a first section and a second shape in a second section. Again, a transition between the first and second sections (and back again, if desired) is readily provided by gradually changing the size of holes in the fibre cross-section. The gradual change in hole size results in an equal number of modes being guided in the first and second sections. An application of such a arrangement would be to provide a double-clad fibre in which light is coupled from diode bars into a pump waveguide.

Figure 11:
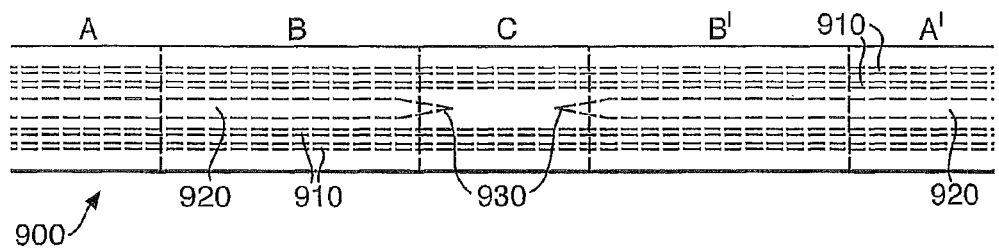
FIG. 11 is a fibre according to the invention having a core that vanishes and reappears along the fibre's length.

Another embodiment of the invention is in a fibre comprising a core region that vanishes or appears at a point along the fibre's length. Fibre 900 (FIG. 11) is such a fibre. In transverse cross-section, it comprises a cladding region comprising a plurality of holes 910 (only four are shown, for ease of illustration) arranged to provide a photonic band-gap at a desired propagation wavelength. Fibre 900 is divided into five regions A, B, C, B' and A'. Regions A and A' are lengths of photonic-band-gap guiding microstructured fibres in which light of wavelength within the band-gap is guided in a large air hole forming core 920. Region B includes a long-period grating, which couples desired components of light guided in core 920 in region A into a cladding mode of fibre 900. Undesired components of the propagating light remain in core 920. However, in region C fibre 900 does not include core 920, and so the undesired light is eliminated. The desired light is coupled from the cladding mode back into core 920 by a second long-period grating, in region B'. The desired components of the light then continue their propagation in core 920 in region A'. Region C does not include core 920 because the hole forming 920 has been collapsed during drawing of the fibre. Abrupt transition regions 930 remain, in which core 920 decreases in cross-sectional area to zero.

In another embodiment (not shown), core 920 is a core of a multicore fibre.

Another embodiment of the invention is a fibre having a first region arranged to guide light in a solid core by total internal reflection and a second region arranged to guide light in an elongate hole by photonic band-gap guidance, the two regions being connected by a transition region in which the elongate hole collapses.

Figure 12:
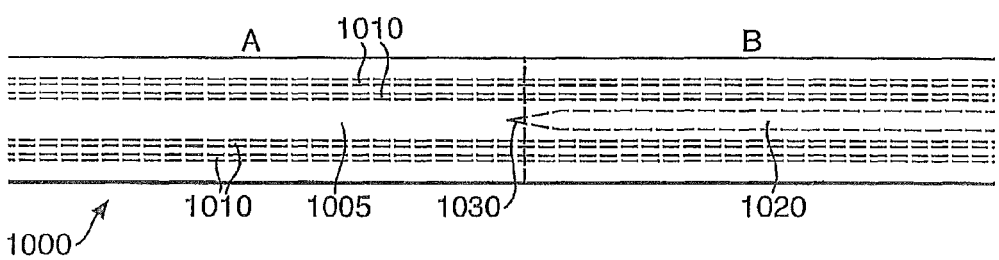
FIG. 12 is a fibre according to the invention having an index-guiding portion and a hollow-core, photonic band-gap guiding portion.

An example of such a fibre is fibre 1000 (FIG. 12). Fibre 1000 comprises a first region A comprising a plurality of holes 1010 (only four are shown, for ease of illustration) embedded in a silica matrix material. The holes 1010 are arranged to provide a band-gap for light of a selected wavelength propagating in air. However, in region A, light is guided in solid silica core region 1005; guidance occurs because holes 1010 lower the effective refractive index of the cladding region of fibre 1000, resulting in total internal reflection between core region 1005 and the cladding region containing holes 1010.

In region B, on the other hand, fibre 1000 includes a low-index core in the form of an elongate air hole 1020, and the band-gap provided by holes 1010 causes light of the selected wavelength to be confined to that hole 1020. Region A does not include air-core 1020 because hole 1020 has been collapsed during drawing of fibre 1000. An abrupt transition region 1030 exists where hole 1020 decreases in cross-sectional area to zero.

Thus the invention provides an arrangement for readily transferring light between regions of fibre that guide by the two different guidance mechanisms known for microstructured fibres. The fibre may thus benefit from advantages of each mechanism; for example, devices only possible in index-guiding fibre may be incorporated in-line in an otherwise photonic band-gap guiding fibre. In the example of FIG. 12, holes 1010 retain the periodicity for photonic band-gap guiding, even in region A. Of course, in other embodiments, the holes in index-guiding regions such as region A may be transferred by selective pressurisation into any configuration that retains an effective refractive index step with the core region.

Set out above are some examples of devices that may be produced in a method according to the invention. It is envisaged that a great many other devices may also be produced according to the method, due to the great range of possible fibre structures that may result from controlling pressure in selected holes of a preform for a microstructured fibre. Also, it may be that the devices described above may be made by methods not according to the invention, for example by post-processing a microstructured fibre (for example, by heat treatment).

The invention claimed is:

1. A preform for a microstructured optical fiber combined with a connector for connecting the preform to an external pressure-controller, said preform comprising a plurality of elongate holes extending along a longitudinal direction of the preform, said connector comprising a plurality of chambers, each chamber being connectable to an external pressure source, the connector and preform being arranged so that at least a first one of said elongate holes terminate in a first one of said chambers and at least a second one of said elongate holes terminate in a second one of said chambers;
   wherein the preform is arranged to pass through one or more of said chambers such that at least one of said elongate holes terminate in a chamber arranged next to a chamber through which the preform passes.

2. The combination of a preform and a connector according to claim 1, wherein said chambers are distributed in the connector along the longitudinal direction of the preform.

3. The combination of a preform and a connector according to claim 1, in which the preform comprises a plurality of elongate elements, arranged side by side in a bundle, a plurality of the elements being tubes, wherein each tube defines one of the holes in the preform.

4. The combination of a preform and a connector according to claim 1, in which the preform comprises a matrix material that defines the holes in the preform.

5. A preform for a microstructured optical fiber combined with a connector for connecting the preform to an external pressure-controller, said preform comprising a plurality of elongate holes or elongate elements comprising holes, said holes extending along a longitudinal direction of the preform, said connector comprising a plurality of sections arranged in a stack extending from a first end to a second end, each section comprising a chamber, a passage in fluid communication with said chamber, and at least one hole in a base of the section, wherein the base hole of a section is arranged to provide access to the chamber of that section for the preform, such that when arranged in relation to the connector the preform is allowed to extend from the first end of the stack through to that section, such that at least one of said elongate holes terminate in the chamber of a section arranged next to the section(s) through which the preform passes, said passage in fluid communication with the chamber being connectable to an external pressure controller so that the chambers of the different sections can be pressurized to a different pressure.

* * * * *